United States Patent
Handwerk

(10) Patent No.: US 11,097,593 B2
(45) Date of Patent: Aug. 24, 2021

(54) VEHICLE AIR CONDITIONING UNIT WITH HEAT EXCHANGER ARRANGED IN SUCTION SIDE

(71) Applicant: Hanon Systems, Daejeon (KR)

(72) Inventor: Detlef Handwerk, Cologne (DE)

(73) Assignee: Hanon Systems, Daejeon (KR)

(*) Notice: Subject to any disclaimer, the term of this patent is extended or adjusted under 35 U.S.C. 154(b) by 144 days.

(21) Appl. No.: 16/428,095

(22) Filed: May 31, 2019

(65) Prior Publication Data
US 2019/0366797 A1 Dec. 5, 2019

(30) Foreign Application Priority Data

Jun. 4, 2018 (DE) .......................... 102018113176.3

(51) Int. Cl.
*B60H 1/00* (2006.01)
*B60H 1/32* (2006.01)

(52) U.S. Cl.
CPC ..... *B60H 1/00464* (2013.01); *B60H 1/00328* (2013.01); *B60H 1/00671* (2013.01); *B60H 1/3202* (2013.01)

(58) Field of Classification Search
CPC .............. B60H 1/3202; B60H 1/00464; B60H 1/00328; B60H 1/00671
See application file for complete search history.

(56) References Cited

U.S. PATENT DOCUMENTS

2018/0029447 A1* 2/2018 Kato .................. B60H 1/00671

FOREIGN PATENT DOCUMENTS

| JP | H11147413 A | 6/1999 |
| JP | 20030112517 A | 4/2003 |
| JP | 20090202734 A | 9/2009 |

* cited by examiner

*Primary Examiner* — Ana M Vazquez
(74) *Attorney, Agent, or Firm* — Norton Rose Fulbright US LLP; James R. Crawford

(57) ABSTRACT

A vehicle climate control unit with an evaporator, a heating heat exchanger as well as a blower, characterized in that, in the direction of the air flow, are disposed, upstream of the blower on the suction side, the evaporator and the heating heat exchanger, and that an additional heating heat exchanger is disposed downstream of the blower on the pressure side.

19 Claims, 1 Drawing Sheet

VEHICLE AIR CONDITIONING UNIT WITH HEAT EXCHANGER ARRANGED IN SUCTION SIDE

This application claims priority from German Patent Application No. 102018113176.3 filed on Jun. 4, 2018. The entire contents of this application is incorporated herein by reference in its entirety.

FIELD OF THE INVENTION

The invention relates to a vehicle climate control unit with heat exchangers that, with respect to the blower, are disposed at the suction side. The vehicle climate control unit is especially well suited to realize also with this construction type an adjustable thermal stratification at the air outlets.

BACKGROUND OF THE INVENTION

Prior art discloses vehicle climate control units in the most diverse implementations. With respect to the air volume flow, the heat exchangers of the climate control unit as well as the evaporator and the heating heat exchangers are typically located on the pressure side of the blower or ventilator. However, there are also vehicle climate control units known in which the heat exchangers, in contrast to the typical configuration, are disposed on the suction side of the blower.

JP 2009 0202734 A discloses a motor vehicle climate control system in which the heat exchangers are disposed on the suction side of the air blower. In this configuration of the heat exchangers it is difficult to achieve thermal stratification at different air outlets of the climate control unit since the disposition of the heat exchangers in front of the blower leads to the formation of a mixed volume flow of cold and warm air in the blower which does not show any thermal stratification. It is consequently not possible to provide an air volume flow with thermal stratification at the pressure side of the blower for the air outlets.

In climate control units that include a pressure-side disposition of the heat exchangers, heating of the air flow after dehumidification in the evaporator is customary.

JP 19990147413 A and JP 20030112517 A furthermore disclose vehicle climate control units which realize the reheat of an air volume flow in the air channel before it reaches the air outlets, wherein the air in the climate control unit had previously been conditioned in the customary manner.

It can consequently be determined that while the disposition of the heat exchangers on the suction side of the blower is known, however it is only realized under certain boundary conditions.

Whether this structural form is chosen depends, inter alia, on the given geometry of the available installation space in the vehicle. Further boundary elements in deciding on this configuration are the accessibility of the individual components for service, the production costs of the climate control unit and further factors that suggest realization of this device concept is reasonable. A significant disadvantage of this is that through the air blower a thorough mixing of the inflowing cold and warm air takes place and all pressure-side air outlets in the vehicle are consequently tempered alike. As a rule, this contradicts the prevailing requirements of vehicle manufacturers who require different tempering and in particular thermal stratification at the air outlets of the vehicle climate control units.

Heating individual air subflows is realized in prior art in combination with the concept of pressure-side disposition of the heat exchangers. Of disadvantage herein is that additional heat exchangers are employed leading to concomitantly higher technical expenditures and complexity and greater costs.

For this reason the invention addresses the problem of specifying a vehicle climate control unit which requires the least possible installation volume and which, moreover, enables the feasibility of achieving thermal stratification at the outlets of the climate control unit, The problem is resolved through a subject matter with the characteristics described herein.

SUMMARY OF THE INVENTION

The problem addressed by the invention is in particular resolved through a vehicle climate control unit which, initially, is structured of the conventional components with heat exchangers as evaporator and as heating heat exchanger, as well as a blower. A particularity in the vehicle climate control unit according to the invention now comprises that in the direction of the air flow the evaporator and the heating heat exchanger are disposed upstream of the blower and thus on the suction side of the blower. According to the concept, there is disposed an additional heating heat exchanger downstream of the blower on the pressure side of the blower. By direction of air flow is understood the direction of the air flowing through the climate control unit which flows from an inlet to the air outlets of the climate control unit. Consequently, the suction-side disposition of the heat exchangers with respect to the blower, combined with the selective reheat of the air flow, or of the air subflow, for generating thermal stratification at specific air outlets in accordance with the specifications for conditioning the vehicle cabin.

According to an especially advantageous implementation, for heating the air only one heating heat exchanger is provided. This one heating heat exchanger has two operating spheres. Those are the spheres of a preheating zone and a reheating zone. The zones of preheating and reheating refer functionally to their disposition with respect to the blower. The preheat zone of the heating heat exchanger is thus disposed upstream of the blower on the suction side, whereas the reheat zone of the heating heat exchanger is disposed in the air flow downstream of the blower on the pressure side.

It is especially preferred for the preheat zone of the heating heat exchanger and the evaporator to be disposed in parallel in the vehicle climate control unit. The air flowing toward the vehicle climate control unit herein flows parallel through the preheat zone of the heating heat exchanger and through the evaporator and the air is consequently, where appropriate, less dehumidified than is the case with series connection of evaporator and heating heat exchanger. However, the advantage of the connection in parallel frequently lies in an especially space-saving implementation of the vehicle climate control unit.

A significant advantage of the parallel disposition resides in a lower air-side pressure loss at temperature settings above "fully cold". In this setting the lower pressure loss leads to reduced power requirements of the blower and, as a rule, also to lesser noise development in comparison to series connections at identical air quantity.

Alternatively to the above described parallel disposition of the heat exchangers, they are connected in series according to a further implementation in the climate control unit inflow which leads to stronger dehumidification of the air, however, this entails most frequently greater space requirements.

It is of advantage for a main temperature louver to be provided between the evaporator and the preheat zone of the heating heat exchanger. The main temperature louver controls herein the ratio of heated to cooled air. The disposition of the louver downstream of the heat exchangers and upstream of the blower enables the regulation of the ratio of warm and cold air into the blower across the louver position of the main temperature louver.

An advantageous implementation of the invention comprises disposing additionally a secondary temperature louver in the reheat flow, wherein the secondary temperature louver controls the ratio of bypass and throughflow of the reheat zone of the heating heat exchanger or of the additional heating heat exchanger. The secondary temperature louver is positioned such that, due to appropriate setting feasibilities, it can realize the complete bypass of the reheat zone of the heating heat exchanger or the complete throughflow of the reheat zone of the heating heat exchanger as well as also intermediate positions.

The secondary temperature louver is preferably mechanically coupled with the main temperature louver and implemented such that it is drivable across the latter. This enables the omission of an additional drive of the secondary temperature louver, should that be applicable, if it is also driven, in operative connection with an optionally interconnected mechanical gearing, through the movements of the main temperature louver.

It can, alternatively, also be of advantage under certain conditions to implement the secondary temperature louver with a separate drive which subsequently results in the independent control of the reheat flow.

The vehicle climate control unit advantageously includes several air outlets on the pressure side of the blower, wherein at least one air outlet is provided for the mixed air flow without reheating and at least one air outlet for a reheat flow with reheating.

As a generalization, the concept of the invention describes that the vehicle climate control unit comprises heat exchangers that are disposed on the suction side, however, beyond the space-saving disposition of the heat exchangers of the vehicle climate control unit, is enabled to meet the requirements of the vehicle producers for available thermal stratification of the units by providing a reheat feasibility for at least one volume subflow of the air on the pressure side of the blower, To realize the concept of the invention, a heating heat exchanger is preferably organized in different segments, or function zones, of preheating and reheating the air flow. The first segment of the heating heat exchanger operates in the classic manner and heats the air before it is mixed with the cold air from the evaporator and is supplied to the blower. The temperature of the inflowing air for the vehicle is controlled ahead of the blower. After passing the blower, the inflowing air can be routed as a mixed air flow into the vehicle cabin.

According to the concept, the air temperature for specific air outlets can additionally be raised thereby that again a segment of the heating heat exchanger is passed through. This reheat zone is provided with a bypass as well as a secondary temperature louver which enables the control or the regulation of the temperature rise, After the secondary temperature louver and the reheat zone of the heating heat exchanger have been passed through, the reheated air flows across the appropriate air outlet of the vehicle climate control unit into the vehicle cabin of the vehicle, A particular advantage of the solution according to the invention comprises the feasibility of generating thermal stratification of the air at the outlets in spite of the device concept of the suction-side disposition of the heat exchangers. Thereby new applications fields are expanded or are opened for vehicle climate control unit concepts in which the blower is located downstream of the heat exchangers.

Especially advantageous is the lower installation space requirement of the vehicle climate control unit and the alternative utilization of the gained space in the vehicle. The installation space reduction is attainable due to the omission of the mixing chamber with the required built-in components for warm and cold air in the climate control unit whereby a considerable reduction of the space requirement is realized. Larger heat exchangers are moreover employable for increasing the heating and cooling capacities. Fewer resources for the development of the temperature regulation curves and of the climate control unit are also required which, overall, lowers the cost of the climate control unit and beyond that also reduces the susceptibility to damage or failure as well as the maintenance expenditures. Similarly, no resources are required for the development of different temperature strands in individual air outlets.

Despite the disposition of the heat exchangers on the suction side of the blower, according to the concept the feasibility of an adjustable temperature stratification in the air outlets toward the vehicle cabin is realized. In an especially advantageous manner through the selective reheating of individual air outlet openings, a mixing chamber and built-in components within the climate control unit can be omitted which conduct the warm and cold air flows specifically to the individual air outlet openings in order to produce the temperature stratification. As a rule, such additional components are necessary in climate control units which realize the disposition of the heat exchangers on the pressure side of the blower.

Further details, characteristics and advantages of embodiments of the invention will be evident based on the following description of embodiment examples with reference to the associated drawing.

DETAILED DESCRIPTION

Figure 1:
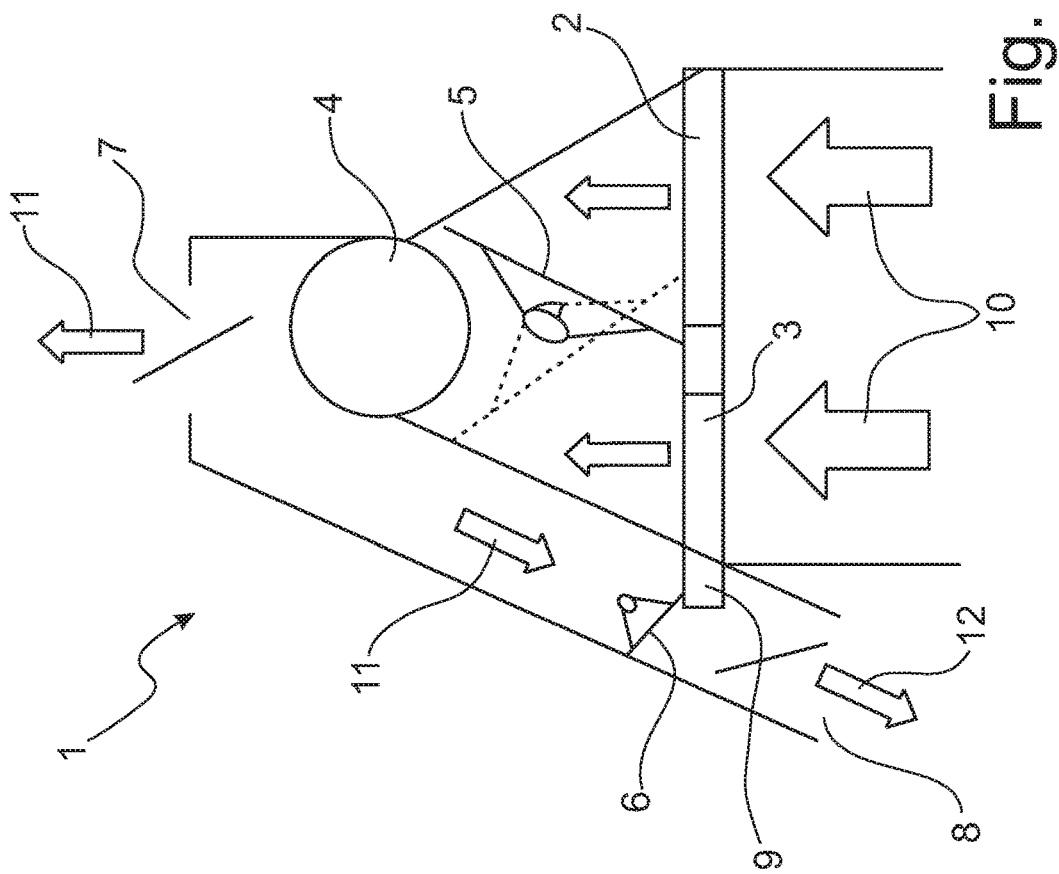
FIG. 1: schematic diagram of a cross section of the vehicle climate control unit with adjustable temperature stratification function

In FIG. 1 is depicted an implementation of a vehicle climate control unit 1 in which the suction-side disposition of the heat exchangers is realized. The vehicle climate control unit 1 comprises, firstly, an evaporator 2 and a heating heat exchanger with a preheat zone 3, The two heat exchangers are located at the suction side with respect to a blower 4, across which the climate control inflow 10 is suctioned into the vehicle climate control unit 1. The air of the climate control inflow 10 in the depicted implementation flows in parallel through the evaporator 2 and the preheat zone 3 of the heating heat exchanger. Between the two heat exchangers 2, 3 and the blower 4 is disposed a main temperature louver 5 that controls the ratio of the air volume flows as a function of the louver position.

The complete heating of the air flowing toward the blower 4 as well as also the complete cooling of the air flowing toward the blower 4 as well as also proportional mixing of cooled and heated air flowing toward the blower 4 can thereby be adjusted by means of the louver position of the main temperature louver 5.

After it has been tempered, the air flow, which at this point is optionally comprised of different components, is now mixed in the blower 4, whereupon a mixed flow 11 leaves the blower 4. The exiting mixed air flow 11 in the depicted embodiment is conducted together with a subflow out of the air outlet 7 with outlet damper. The air outlet 7 is also termed dashboard vent, A further subflow of the mixed air flow 11 is routed to the air outlet 8 in the footwell where it is intended to flow out. On the path to the air outlet 8, this subflow of the mixed air flow 11 passes through a secondary temperature louver 6 which is disposed in the region of the reheat zone 9 of the heating heat exchanger. In a louver position set for bypass the particular mixed air flow 11 is routed past the reheat zone 9 of the heating heat exchanger without being reheated to the air outlet 8 in the footwell. In the opposite louver position the entire mixed air flow 11 is routed across the reheat zone 9 of the heating heat exchanger, whereby reheating is carried out before the subsequently heated mixed air flow 11 leaves the vehicle climate control unit 1 as reheat flow 12 across the air outlet 8 in the footwell.

Figure 2:
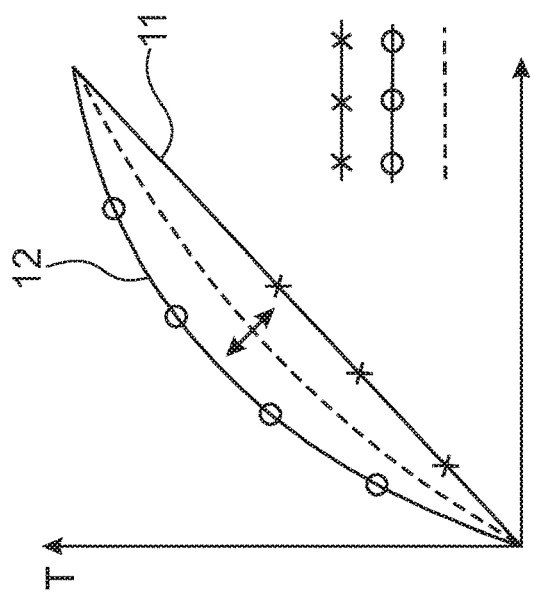
FIG. 2: diagram to represent the temperature spread through reheating with a vehicle climate control unit of the construction type according to FIG. 1.

FIG. 2 represents a depiction of the outlet temperature T of the air at the air outlets dashboard vent 7 and footwell 8 on the ordinate or Y-axis over the different louver positions from cold to hot on the abscissa or X-axis of the system of coordinates.

The linear function course indicates with cross marks the temperature of the outflowing air as a function of the louver position of the main temperature louver 5 for the mixed air flow 11. If the secondary temperature louver 6 is moved to bypass position, the air leaving the air outlet 8 in the footwell corresponds to the temperature profile of the mixed air flow 11. If the secondary temperature louver 6 is moved out of the bypass position to the opposite position, the reheat flow 12 is heated and a temperature spread results and entailed therein a temperature stratification at the air outlet 8 in the footwell, depicted in the curve profile with dot markings and the curve profile indicated in dashed line.

LIST OF REFERENCE NUMBERS

1 Vehicle climate control unit
2 Evaporator
3 Heating heat exchanger preheat zone
4 Blower
5 Main temperature louver
6 Secondary temperature louver
7 Air outlet dashboard vent with outlet damper
8 Air outlet footwell with outlet damper
9 Heating heat exchanger reheat zone
10 Climate control system inflow
11 Mixed air flow
12 Reheat flow It is claimed:

1. A vehicle climate control unit with an evaporator, a heating heat exchanger for heating air as well as a blower, wherein, in a direction of an air flow, the evaporator and the heating heat exchanger are disposed upstream of the blower on a suction side, and an additional heating heat exchanger is disposed downstream of the blower on a pressure side, wherein the heating heat exchanger is provided which comprises a preheat zone and a reheat zone opposing in flow in relation to the disposition of the zones to the blower.

2. The vehicle climate control unit according to claim 1, wherein a main temperature louver is disposed between the evaporator and the preheat zone, wherein the main temperature louver controls the ratio of heated to cooled air.

3. The vehicle climate control unit according to claim 2, wherein a secondary temperature louver is disposed in a reheat flow.

4. The vehicle climate control unit as in claim 3, wherein the secondary temperature louver is mechanically coupled with the main temperature louver and is implemented such that it is drivable thereacross.

5. The vehicle climate control unit according to claim 4, wherein several air outlets are provided on the pressure side of the blower, wherein at least one air outlet is provided for a mixed air flow without reheating, and at least one air outlet is provided for a reheat flow with reheating.

6. The vehicle climate control unit as in claim 3, wherein the secondary temperature louver is implemented with a separate drive.

7. The vehicle climate control unit according to claim 6, wherein several air outlets are provided on the pressure side of the blower, wherein at least one air outlet is provided for a mixed air flow without reheating, and at least one air outlet is provided for a reheat flow with reheating.

8. The vehicle climate control unit according to claim 3, wherein several air outlets are provided on the pressure side of the blower, wherein at least one air outlet is provided for a mixed air flow without reheating, and at least one air outlet is provided for a reheat flow with reheating.

9. The vehicle climate control unit according to claim 2, wherein several air outlets are provided on the pressure side of the blower, wherein at least one air outlet is provided for a mixed air flow without reheating, and at least one air outlet is provided for a reheat flow with reheating.

10. The vehicle climate control unit according to claim 1, wherein several air outlets are provided on the pressure side of the blower, wherein at least one air outlet is provided for a mixed air flow without reheating, and at least one air outlet is provided for a reheat flow with reheating.

11. The vehicle climate control unit according to claim 1, wherein the heating heat exchanger preheat zone and the evaporator are disposed in parallel in the climate control system inflow for the air.

12. The vehicle climate control unit according to claim 1, wherein several air outlets are provided on the pressure side of the blower, wherein at least one air outlet is provided for a mixed air flow without reheating, and at least one air outlet is provided for a reheat flow with reheating.

13. The vehicle climate control unit according to claim 1, wherein a main temperature louver is disposed between the evaporator and the heating heat exchanger preheat zone, wherein the main temperature louver controls the ratio of heated to cooled air.

14. A vehicle climate control unit with an evaporator, a heating heat exchanger for heating air, as well as a blower, wherein, in a direction of an air flow, the evaporator and the heating heat exchanger are disposed upstream of the blower on a suction side and that an additional heating heat exchanger is disposed downstream of the blower on a pressure side, wherein a heating heat exchanger preheat zone and the evaporator are disposed in parallel in a climate control system inflow for the air.

15. The vehicle climate control unit according to claim 14, wherein several air outlets are provided on the pressure side of the blower, wherein at least one air outlet is provided for a mixed air flow without reheating, and at least one air outlet is provided for a reheat flow with reheating.

16. The vehicle climate control unit according to claim 14, wherein a main temperature louver is disposed between the evaporator and the heating heat exchanger preheat zone, wherein the main temperature louver controls the ratio of heated to cooled air.

17. A vehicle climate control unit with an evaporator, a heating heat exchanger for heating air as well as a blower, wherein, in a direction of an air flow, the evaporator and the heating heat exchanger are disposed upstream of the blower on a suction side and that an additional heating heat exchanger is disposed downstream of the blower on a pressure side, wherein a heating heat exchanger preheat zone and the evaporator are connected in series in a climate control system inflow for the air.

18. The vehicle climate control unit according to claim 17, wherein several air outlets are provided on the pressure side of the blower, wherein at least one air outlet is provided for a mixed air flow without reheating, and at least one air outlet is provided for a reheat flow with reheating.

19. The vehicle climate control unit according to claim 17, wherein a main temperature louver is disposed between the evaporator and the heating heat exchanger preheat zone, wherein the main temperature louver controls the ratio of heated to cooled air.

* * * * *